FLY FRAME

Filed Sept. 29, 1966

6 Sheets-Sheet 1

Hidejiro Araki and
Kenji Tsujioka, Inventors

By, Wenderoth, Lind and Ponack,
Attorneys

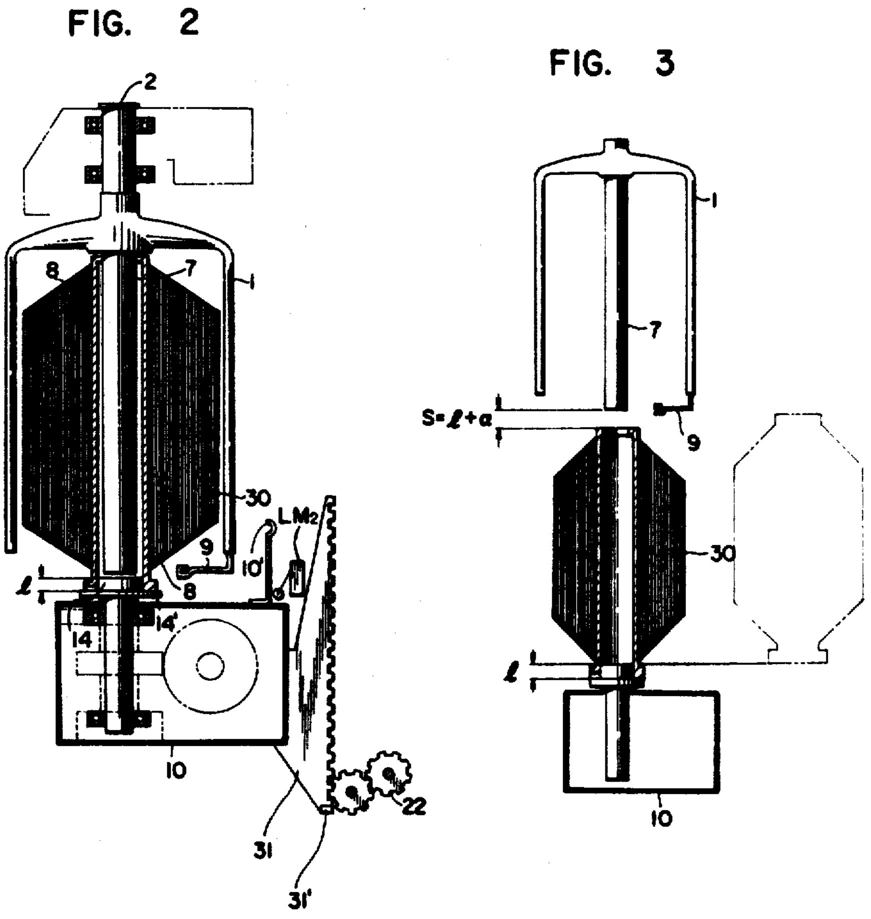
FIG. 2, FIG. 3
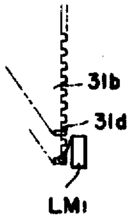
Hidejiro Araki and
Kenji Tsujioka, Inventors
By, Wenderoth, Lind and Ponack,
Attorneys Hidejiro Araki and
Kenji Tsujioka, Inventors
By, Wenderoth, Lind and Ponack,
Attorneys Hidejiro Araki and
Kenji Tsujioka, Inventors By, Wenderoth, Lind and Ponack,
Attorneys

FLY FRAME

Hidejiro Araki and
Kenji Tsujioka, Inventors
By, Wenderoth, Lind and Ponack,
Attorneys April 30, 1968 HIDEJIRO ARAKI ET AL 3,380,238

FLY FRAME

Filed Sept. 29, 1966 6 Sheets-Sheet 6

Hidejiro Araki and
Kenji Tsujioka, Inventors

By, Wenderoth, Lind and Ponack,
Attorneys

United States Patent Office 3,380,238
Patented Apr. 30, 1968

3,380,238
FLY FRAME
Hidejiro Araki, Aichi-gun, and Kenji Tsujioka, Kariya, Japan, assignors to Toyoda Automatic Loom Works, Ltd., Kariya, Japan
Filed Sept. 29, 1966, Ser. No. 583,010
8 Claims. (Cl. 57—52)

ABSTRACT OF THE DISCLOSURE

A fly frame having an upper rail and a bobbin rail, a plurality of flyers mounted on the upper rail and each having at its central portion a bobbin guide arbor adapted to support and guide the upper end of a bobbin during the bobbin winding and building motion, the bobbin rail having a bobbin driving mechanism thereon and a plurality of bobbin drive shafts thereon coupled to the bobbin driving mechanism and each having a short supporting member mounted on the extension of each bobbin drive shaft for supporting the lower end of a bobbin in driving engagement therewith, and means coupled to the bobbin rail for lowering the bobbin rail and the bobbin driving mechanism therein a distance equal to the length of the bobbin and said short supporting plug plus a marginal clearance which is sufficient to allow the bobbins to be freely shifted laterally without any interference from the said guide arbor.

This invention relates to a fly frame, particularly to an apparatus for automatically or semi-automatically doffing the full bobbin and donning the empty bobbin in a fly frame.

Recently, many attempts have been made at automation of the spinning industry, and it has been proposed to automate the operation of bobbin doffing from the fly frame for the purpose of saving labor and of improving the production. With conventional fly frames, however, it has been considered very difficult to provide automatic doffing, since in the conventional fly frame the flyer is mounted on the top of the spindle and is driven by said spindle from the bottom thereof, so that on doffing and donning the bobbin the flyer has to be dismounted from the top of the spindle. This makes it practically impossible to devise a mechanical automated apparatus for doffing and donning of the bobbin, in so far as such mounting of the flyer is employed.

An object of the present invention is to provide a new and improved arrangement of the flyer by mounting it on the upper rail and driving it at the top of the machine, thereby dispensing with the necessity of dismounting the flyer upon doffing and donning of the bobbin.

Another object of the invention is to provide an improved structure of said flyer which is mounted at the top of the machine, wherein a bobbin guide arbor is connected to the flyer, and to provide an extremely short supporting member secured to the bobbin drive shaft on the bobbin rail for supporting the lower end of the bobbin guided by said arbor, thereby facilitating the doffing and donning of the bobbin.

A further object of the invention is to provide such a bobbin guide arbor which is detachably connected to the flyer, such that at an intermediate stage a malfunctioning bobbin caused by exhaustion of sliver or breakage of roving can be removed, thereby preventing any flying of fibers.

Still another object of the invention is to provide a differential gear mechanism in the building motion drive mechanism, which is adapted for automatic control for lowering and elevating the bobbin rail for the purpose of bobbin doffing and for re-starting the bobbin winding operation, as well as for normal building drive, thereby dispensing with any manual operation.

A still further object of the invention is to provide a new mechanism adapted for automatic doffing of the full bobbin and for automatic donning of the empty bobbin, which mechanism is operated in co-operation with the mechanism for lowering and elevating the bobbin rail.

Other objects and advantages will become more fully apparent as reference is had to the accompanying drawings, in which:

FIG. 2 is a sectional view showing a full bobbin in the position just before doffing thereof;

FIG. 3 shows the full bobbin completely lowered away from the flyer to the lowermost position for doffing, and showing in dot-and-dash lines the same bobbin laterally shifted;

Figure 1:
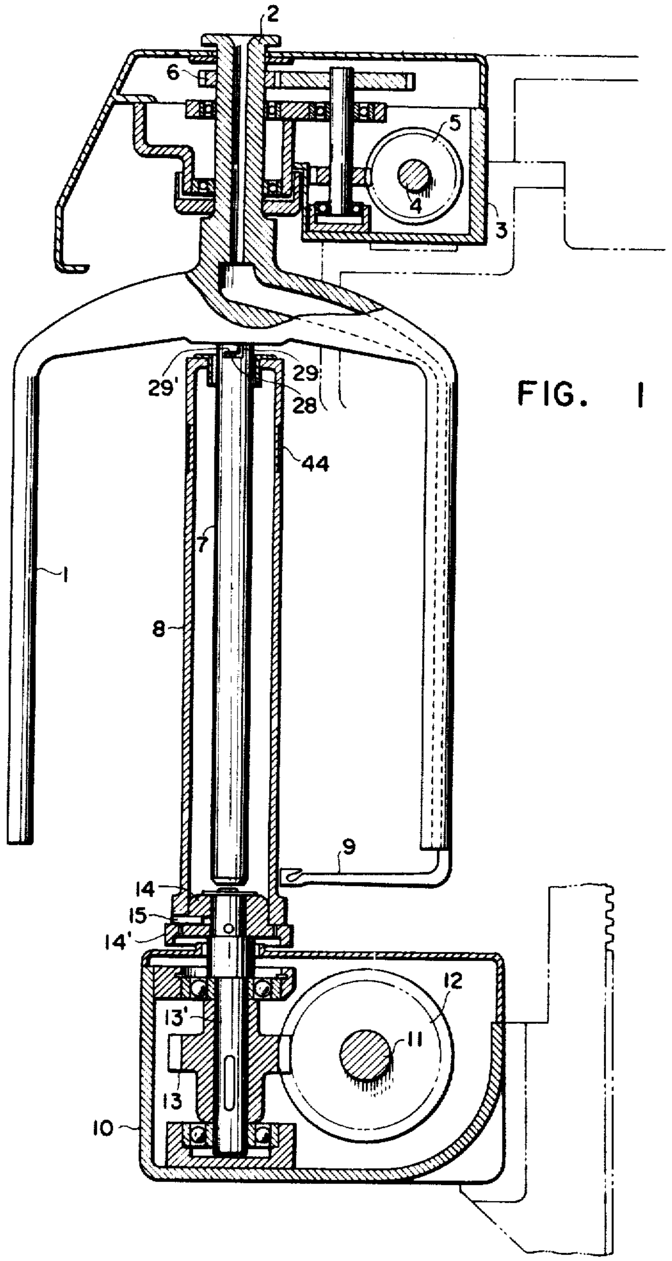
FIG. 1 is a sectional view of the mounting and driving mechanisms for the flyer and bobbin of the fly frame embodying the present invention.

Referring now to the drawing, as an example of one form in which the present invention can be embodied, there is shown in FIG. 1 a flyer 1 having a roving guide tube 2, which is mounted and supported on an upper rail 3 through a suitable mechanism. In the mechanism shown, a flyer drive wheel 5 on a driving shaft 4 drives a gear 6 fixed on the guide tube 2 through a suitable gear train, so that the flyer 1 is rotated. The flyer 1 is provided at its central portion with a bobbin guide arbor 7 which serves to guide and support a bobbin 8. A presser 9 for the flyer is provided for guiding the roving toward the bobbin 8.

Figure 15:
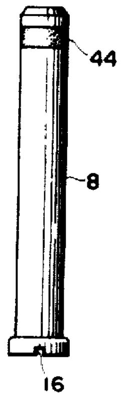
FIGS. 15 to 19 show various modified forms of the bobbin equipped with friction surface areas for easy catching of the free end of the roving coming from the presser of the flyer at the start of rotation of the new bobbin.

In a bobbin rail 10, there is a drive shaft 11 having a drive wheel 12 which meshes with a bobbin wheel 13 on a bobbin drive shaft 13', the upper end of which is provided with a bobbin supporting member or plug 14 having a flange 14' and projecting above the bobbin rail 10 as shown. In the above manner, the bobbin 8 is guided and supported at its upper end by the bobbin guide arbor 7, and at its lower end by said supporting member or plug 14 with the flange 14'. Said plug 14 has a radially projecting pin 15 which is adapted to engage with a recess 16 formed at the lower extremity of the bobbin 8 (FIG. 15), whereby the rotation of the bobbin driving wheel 13 may be transmitted to the bobbin 8.

In the fly frame, the vertical traverse motion of the bobbin rail 10 is maximum at the start of winding, and it is essential that the bobbin 8 is always supported by the guide arbor 7 even at the beginning of the vertical traverse motion of the bobbin, so that the length of the bobbin guide arbor 7 should be determined taking the above into consideration. On the other hand, the length of the bobbin supporting member or plug 14 should be so determined that the bobbin 8 may maintain its stabilized position after the upper end of the bobbin has been released from the lower end of the arbor 7 upon the end of the downward motion of the bobbin 8. This fact should be taken into consideration with respect to the downward movement of the bobbin rail 10 for the bobbin doffing operation.

Figure 4:
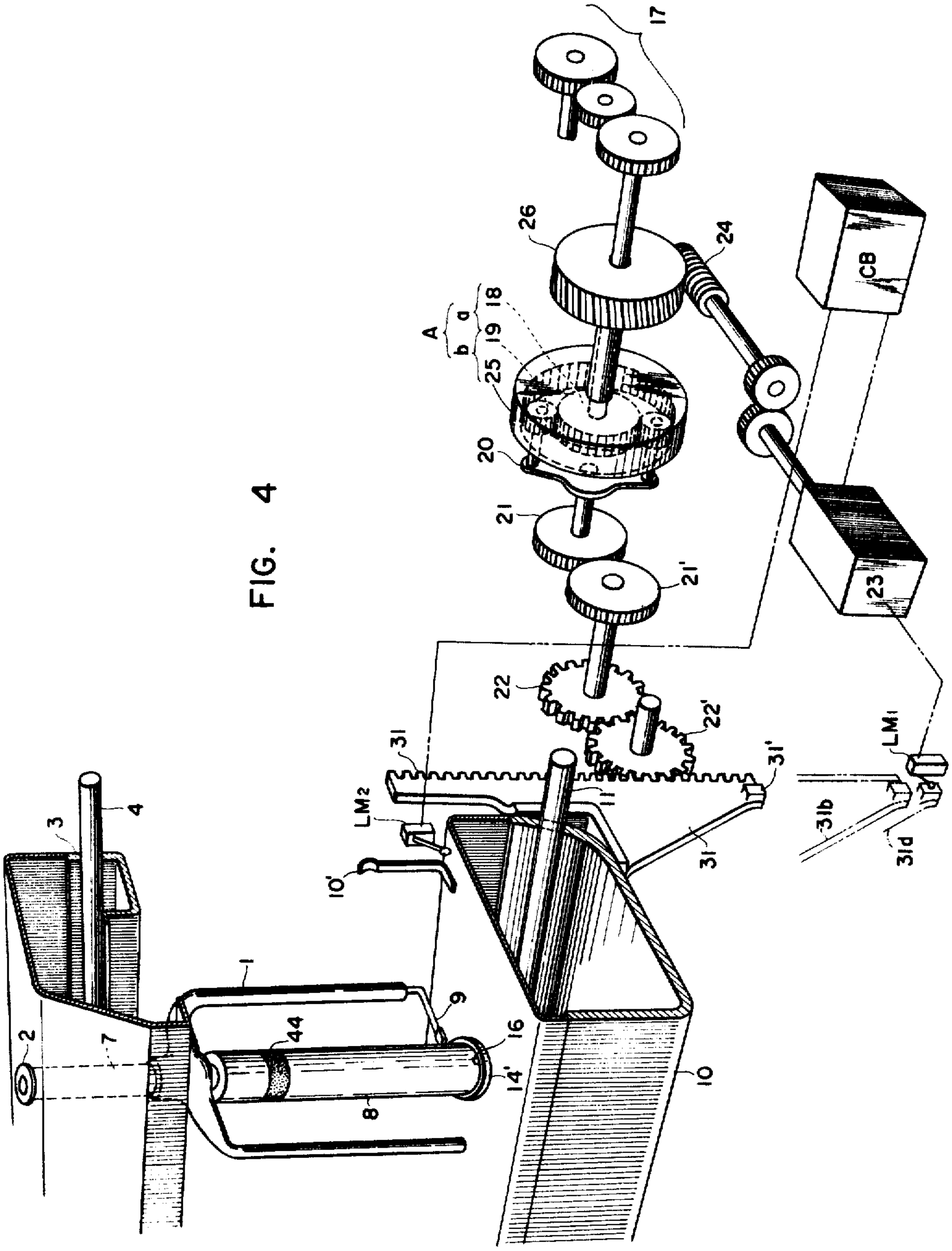
FIG. 4 is a perspective view of the mechanism for building motion of the bobbin, including a control device for effecting automatic lowering movement of the bobbin for doffing purposes.

The mechanism for the bobbin building motion of the bobbin rail 10 will be described referring to FIG. 4 as follows: A train of gears 17 are adapted to be rotated in both directions through a suitable reversing gear (not shown) controlled according to a predetermined building motion. Reference character A designates a differential gear, in the example shown a plenetary gear, of which a sun gear 18 is driven from said train of gears 17. The normal drive system *a* (building motion drive system) consists of said sun gear 18, planetary pinions 19, a planet carrier 20, gears 21, 21′ and lifter gears 22, 22′ meshing with a vertical rack 31 belonging to the bobbin rail 10, thereby said gear 22′ will be positively rotated in normal and reverse directions. A motor 23 is provided for driving a worm gear 24 meshing with a worm wheel 26 which is loosely mounted on a shaft of said sun gear 18 and is rigidly connected with an internal ring gear 25 so as to be rotated in unison. The second drive system, i.e. an independent drive system *b*, consists of said worm wheel 26, the pinions 19 making planetary motion around the stationary sun gear 18, the internal ring gear 25, the planet carrier 20, and the gears 21, 21′, 22, 22′. In view of the fact that the worm wheel 26 is loosenly mounted on the shaft of the sun gear 18 and is normally maintained stationary, the above mentioned independent drive system *b* is not affected during the operation of the normal drive system *a* for the building motion drive.

Normally the bobbin rail 10 is subjected to vertical reciprocating motion, and the change-over of the upward and downward motion being made gradually earlier under the control of a conventional building motion control device, so that the desired shaping of the conical ends of the full bobbin is effected. Beneath the vertical rack 31, there is provided a limit switch $LM_1$ for controlling the motor 23, and at the lower end of the rack there is a contact finger 31′ as shown in FIGS. 2 and 4. During the normal vertical traversing motion (building motion) of the bobbin rail 10, the dot-and-dash line position **31*b* (FIGS. 2 and 4) of the rack 31** is the lowermost position and, at this position, the limit switch $LM_1$ is not actuated by the rack.

During the winding and building motion, it some times happens that exhaustion of the sliver or some other trouble in a preceding spinning device occurs, causing a stoppage of the normal winding and shaping operation in the related bobbin of the fly frame. If the operation of the machine were continued under such condition, the broken end of the roving on the bobbin would fly out toward the adjacent bobbin by the action of centrifugal force, influencing the adjacent parts with undesirable results. In view of the above, in the section where the bobbin winding and shaping operation is stopped, it is essential that the bobbin be doffed immediately.

Figures 5, 6, 7:
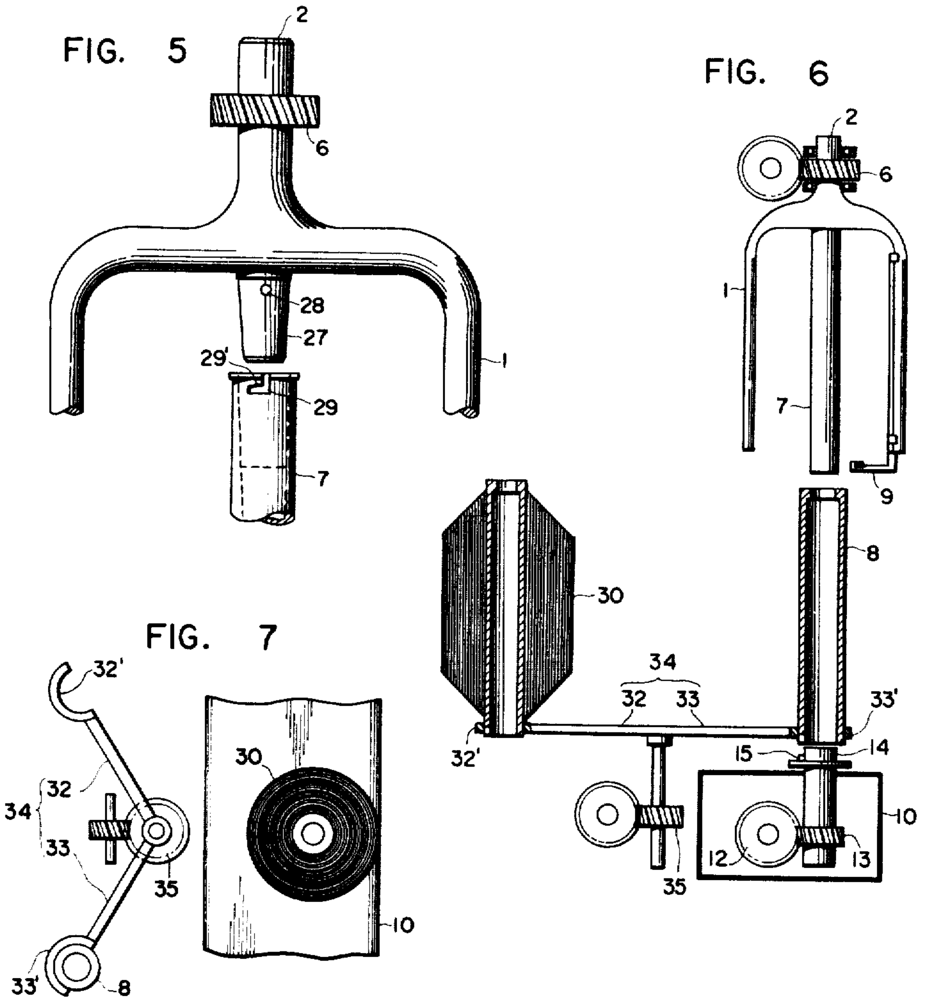
FIG. 5 is a detailed view showing an example of the connection of the upper end of the bobbin with the flyer.
FIG. 6 shows horizontally rockable levers for taking off the full bobbin and for supplying the empty bobbin.
FIGS. 7 to 10 show in plan view said horizontally rockable doffing and donning levers in the order of their manner of operation.

As shown in FIG. 5, the flyer 1 is provided at the central portion with a short depending projection 27 which is tapered and has a lateral pin 28 affixed thereto. The bobbin guide arbor 7, which is tubular at least at the upper end portion thereof, is provided with tapered bore in comformity with the taper of said projection 27. At the upper end of the arbor 7, there is a notch 29 with a hooked portion 29′ having a somewhat inclined edge. The notch 29, co-operating with said pin 28 on the projection 27, forms a so-called bayonet joint. By means of said bayonet joint, the bobbin guide arbor 7 may be readily mounted on the flyer 1. With respect to the bobbin having a broken roving, the bobbin guide arbor 7 may be easily dismounted by rotating it in the direction for disengaging the notch 29 from the pin 28, whereby it would be possible to protect the adjacent bobbins from being affected by said bobbin.

Figure 12:
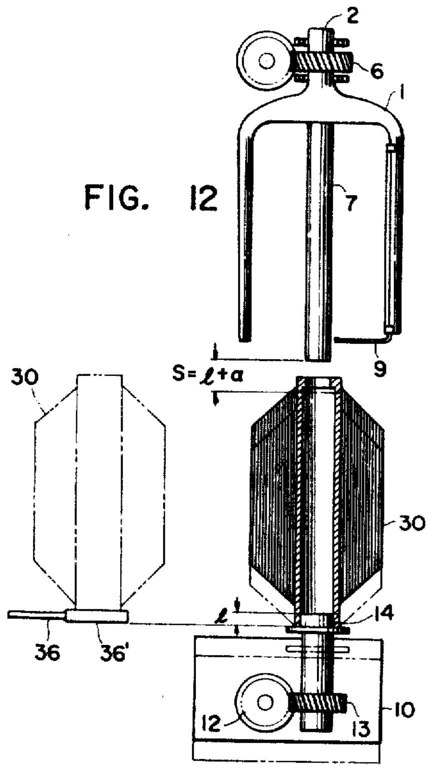
FIG. 12 is a side view of the doffing device, showing the manner of doffing the full bobbin by means of the doffing lever.
Figure 13:
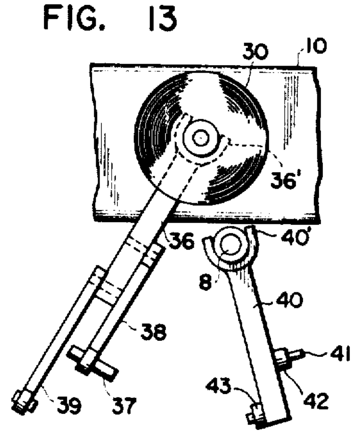
FIGS. 13 and 14 show a manner of operation of the device shown in FIG. 11.

Now, upon the completion of the winding and shaping operation, the doffing of the full bobbin and the donning of an empty bobbin must be effected. For this purpose, the bobbin rail 10 is lowered to the doffing position by putting the independent drive system *b* into operation. A control box CB shown in FIG. 4 serves to send starting instructions to the motor 23 at a predetermined time. Upon start of the motor 23, the rotation is transmitted to the gears 22 and 22′ through the independent drive system *b* consisting of the worm wheel 26, the ring gear 25, and the planet carrier 20. The direction of said rotation is in the direction to lower the bobbin rail 10. The distance of the downward movement of said bobbin rail 10 should correspond with the distance for which the upper end of the full bobbin is dismounted and lowered from the guide arbor 7, plus the distance $s$ (FIG. 12). The distance $s=l+\alpha$, where $l$ is the axial length of the bobbin supporting plug 14 on the bobbin drive shaft 13′, and $\alpha$ is a margin. When the supporting plug 14 is lowered apart from the lower end of the full bobbin 30, the latter may be freely shifted laterally without giving any interference from the guide arbor 7.

Upon the downward movement of the bobbin rail 10 toward the bobbin doffing position, the finger 31′ on the vertical rack 31 will engage the limit switch $LM_1$, thereby sending necessary instructions to the motor 23. At the beginning of the downward movement of the bobbin rail 10, the roving will be stretched and broken between the bobbin 30 and the presser 9 of the flyer 1, the broken end of the roving depending from the presser.

In effecting the doffing of the full bobbin, it is necessary that there be performed vertical relative motion between the full bobbin 30 and the bobbin rail 10. The device as shown in FIGS. 6 to 14 will carry out such a doffing operation. In this device, the full bobbin catching lever is adapted to be moved horizontally, and the bobbin rail moving device is so designed that the bobbin rail 10 is stopped just before reaching the bobbin doffing position, during which period the doffing lever catches the full bobbin and, thereafter, the downward movement of the bobbin rail 10 is again commenced until it reaches the predetermined bobbin doffing position, thereby causing the bobbin to be completely detached from the supporting plug 14, enabling the bobbin to be laterally shifted. The necessary timing control of said downward movement of the bobbin rail 10 may be effected by employing a suitably designed timer. The manner of operation of the doffing lever device will be described below referring to FIGS. 6 to 10.

Figure 8:
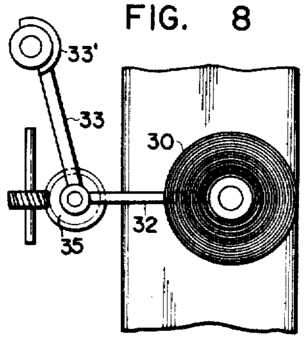

The doffing lever device 34 consists of a full bobbin doffing arm 32 having a catcher or gripper 32′ and an empty bobbin donning arm 33 having a catcher or gripper 33′, said lever 34 being adapted to be turned by rotation of a gear 35. When the bobbin rail 10 is lowered and stopped immediately back of the doffing position, the doffing lever 34 is turned by partial rotation of the gear 35 through a predetermined angle, and the catcher or gripper 32′ of the arm 32 will grip the lower neck of the full bobbin 30 (FIG. 8). Continued downward movement of the bobbin rail 10 enables the full bobbin 30 to be shifted laterally and, upon the continued rotation of the gear 35, the doffing arm 32 carrying the full bobbin will be carried out of the bobbin rail 10 (FIG. 9) and, on the other hand, the arm 33 carrying the empty bobbin 8 will be turned to the donning position (FIG. 9) over the bobbin supporting plug 14.

Figure 9:
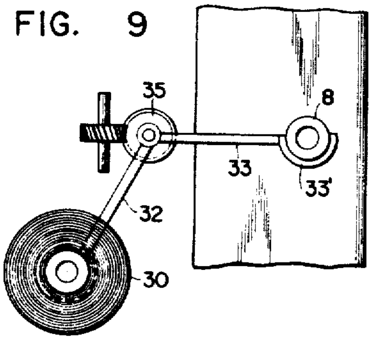
Figure 10:
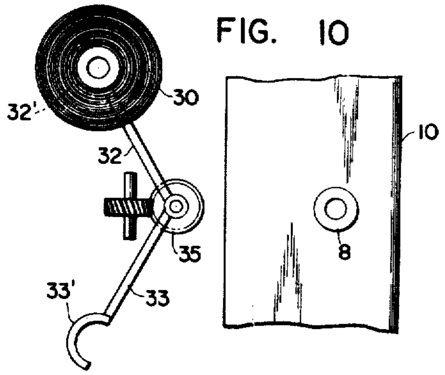
Figure 11:
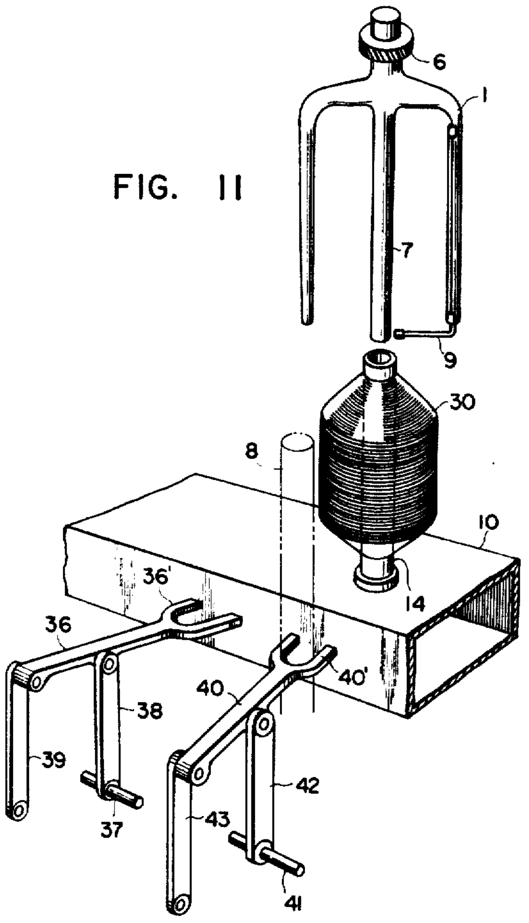
FIG. 11 is a perspective view of a modified form of the doffing and donning lever device.
Figure 14:
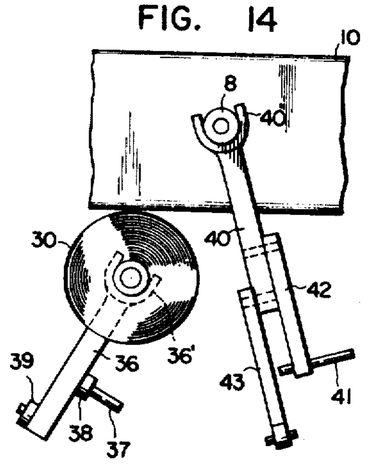

To effect the upward movement of the bobbin rail 10, the operator sends instructions to the control box CB for starting the motor 23 to rotate in the reverse direction. In this case, by employing a suitable timer the upward movement of the bobbin rail is so controlled that the bobbin rail is stopped at a slightly raised position, and during this stopping period the empty bobbin 8 carried by the gripper of the donning arm 33 is put on the bobbin supporting plug 14 (FIG. 9). At that moment the doffing lever device 34 is moved away from the bobbin rail 10, and the upward movement of the latter is again commenced and continued until a finger 10' fixed on the bobbin rail 10 engages a second limit switch $LM_2$ in FIG. 4, whereby the operation of the motor 23 is stopped In FIGS. 11 to 14, there is shown another form of the full bobbin doffing and empty bobbin donning device. When the lowering bobbin rail 10 is stopped at the position immediately above of the lowermost position, a shaft 37 is rotated, so that a full bobbin doffing arm 37 is rotated, so that a full bobbin doffing arm 36 supported by links 38 and 39 and having a gripper 36' is moved forwardly toward the full bobbin 30 and grips the lower neck of the bobbin. At that time the bobbin rail is lowered to the doffing position, and the full bobbin 30 is separated from the supporting plug 14. Then, the arm 36 carrying the full bobbin is retracted to its initial position out of the path of the bobbin rail 10. At the same time, a shaft 41 is rotated, so that an empty bobbin donning arm 40 carrying a gripper 41' and supported by links 42 and 43 is moved forwardly toward the bobbin, and the empty bobbin 8 carried by the gripper 40' is put on the supporting plug 14. Similarly as in the case of the device shown in FIGS. 6 to 10, the upwardly moving bobbin rail is stopped at the slightly raised position, and during this stopping period the empty bobbin 8 carried by the arm 40 is put on the bobbin supporting plug 14 (FIG. 14). Then, said empty bobbin donning arm 40 is retracted to its initial position (FIG. 14), and the bobbin rail 10 continues its upward movement up to the winding starting position.

As above mentioned, in any of the doffing and donning lever devices shown in FIGS. 6 to 10 and FIGS. 11 to 14, when the full bobbin 30 is to be shifted laterally from the supporting plug position, the bobbin rail should be subjected to the last short distance downward movement or to the first short distance upward movement, while the doffing arm or the donning arm is kept stationary. It is to be understood that, in contradistinction to the above, the device may be so designed that the bobbin doffing arm or the donning arm is slightly raised or lowered, while the bobbin rail is stopped during the time the doffing or donning is effected.

Figure 16:
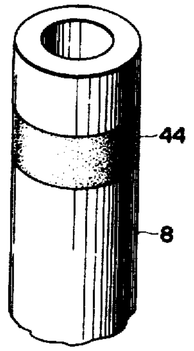
Figure 17:
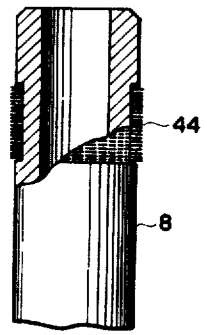
Figure 18:
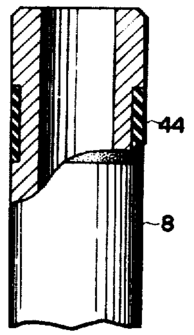
Figure 19:
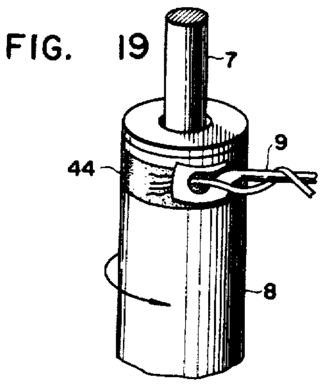

In bringing about engagement of the projection or finger 10' on the bobbin rail 10 with the second limit switch $LM_2$, it is essential that the position of the bobbin rail 10 relative to the empty bobbin 8 corresponds with the winding starting position. According to the present invention, means for automatically putting the roving around the empty bobbin 8 are provided. The empty bobbin 8 is provided with a peripheral band 44 of friction material at the area of the winding initiating position thereof, i.e., the position where the presser 9 of the flyer 1 comes into contact. As mentioned hereinbefore, when the bobbin rail 10 is lowered for the purpose of doffing the full bobbin, the roving between the presser 9 and the full bobbin will be stretched and broken and the broken end of the roving depends from the presser. Under such condition, to initiate the winding the flyer 1 and the empty bobbin 8 are rotated by starting the operation of the motor 23 for the normal drive, without necessitating any manual operation. Then, as shown in FIG. 19, the presser 9 sweeps the periphery of the empty bobbin 8 under considerable pressure by the action of centrifugal force, so that said roving depending from the presser 9 will be pressed against the friction band 44. Thus, the roving will be wound around the empty bobbin 8, being pulled out from the presser by the higher r.p.m. of the bobbin. The formation of said friction band 44 on the empty bobbin may be effected in any manner. For instance, in FIG. 16 the friction band 44 is formed by merely roughening the material of the bobbin in the band area; in FIG. 17 the friction band 44 of fibrous material is formed by means of so-called static flocking method; and in FIG. 18 the friction band 44 is formed by applying a band of felt in a shallow annular groove.

While it will be apparent that the preferred embodiment herein illustrated as well able to fulfill the objects above stated, it will be appreciated that the invention is susceptible to modification, variation and change without departing from the proper scope or fair meaning of the following claims. For example, instead of having the short depending projection 27 rigidly connected with the flyer (FIG. 5), said projection 27 may be made rotatable relative to the flyer proper 1, providing an antifriction bearing. By such means, it would be possible to prevent undue wear of the upper end portion of the bobbin 8.

What we claim is:

1. A fly frame having an upper rail and a bobbin rail, a plurality of flyers mounted on the upper rail and each having at its central portion a bobbin guide arbor adapted to support and guide the upper end of a bobbin during the bobbin winding and building motion, the bobbin rail having a bobbin driving mechanism thereon and a plurality driving mechanism thereon and a plurality of bobbin drive shafts thereon coupled to the bobbin driving mechanism and each having a short supporting member mounted on the extension of each bobbin drive shaft for supporting the lower end of a bobbin in driving engagement therewith, and means coupled to the bobbin rail for lowering the bobbin rail and the bobbin driving mechanism therein a distance equal to the length of the bobbin and said short supporting plug plus a marginal clearance which is sufficient to allow the bobbins to be freely shifted laterally without any interference from the said guide arbor.

2. A fly frame as claimed in claim 1, further comprising means adjacent the bobbin rail for doffing the lowered full bobbins by shifting them laterally.

3. A fly frame as claimed in claim 1, further comprising means adjacent the bobbin rail for doffing the full bobbins from the lowered bobbin rail by shifting them laterally and means adjacent the bobbin rail for supplying empty bobbins, said means for lowering the bobbin rail also lifting the bobbin rail to bring the said empty bobbins to the position for initiating the bobbin winding.

4. A fly frame as claimed in claim 1 in which each flyer has at its central portion a depending short projection to which the upper end of the bobbin guide arbor is detachably mounted.

5. A fly frame as claimed in claim 1, wherein said means for lowering the bobbin rail comprises a motor, a mechanism for lowering the bobbin rail driven by said motor, a control box coupled to said motor for sending starting instructions to said motor, said mechanism comprising a differential gear mechanism adapted to transmit vertical traverse motion to the bobbin rail without being driven from said motor and having an independent drive adapted to transmit the lowering motion to the bobbin rail by operation of said motor, and a limit switch coupled to said motor adapted to operate at the time the bobbin rail reaches the doffing position to send stopping instructions to said motor.

6. A fly frame as claimed in claim 1, further comprising a bobbin exchange apparatus adjacent each bobbin position on said bobbin rail and comprising a doffing lever device having a full bobbin take-off arm and an empty bobbin supplying arm, and means coupled to said doffing lever device for rotating said doffing lever device for causing said take-off arm to grip and remove the full bobbin, while said supply arm supplys an empty bobbin to a position above the supporting member on the bobbin rail, so that an empty bobbin is suppored upon the supporting member on vertical relative motion of said lever device and the bobbin rail.

7. A fly frame as claimed in claim 1, further comprising a bobbin exchange device adjacent each bobbin position on said bobbin rail and comprising a doffing lever device having a full bobbin take-off arm and an empty bobbin supply arm, and means to move said arms toward the bobbin rail and to retract said arms form the bobbin rail.

8. A fly frame as claimed in claim 1, in which each flyer has a presser, and further comprising a plurality of bobbins each having on its peripheral surface a friction area at the position contacted by the presser of the flyer at the start of the winding operation, and said friction area being adapted to easily catch the end of the roving coming from the presser of the flyer.

References Cited

UNITED STATES PATENTS

| | | | |
|---|---|---|---|
| 1,200,343 | 10/1916 | Hampe | 57—52 |
| 1,280,381 | 10/1918 | Boyd | 57—52 |
| 1,912,072 | 5/1933 | Fraser et al. | 57—54 |
| 2,898,726 | 8/1959 | Noda | 57—54 |

FOREIGN PATENTS

| | | |
|---|---|---|
| 517,701 | 1/1931 | Germany. |

FRANK J. COHEN, *Primary Examiner.*

W. H. SCHROEDER, *Assistant Examiner.*